United States Patent
Walters

[15] 3,642,015
[45] Feb. 15, 1972

[54] TEMPERATURE CONTROLLING LIQUID VALVE

[72] Inventor: William R. Walters, 1300 Sunset, Pawhuska, Okla. 74056

[22] Filed: June 27, 1969

[21] Appl. No.: 837,147

[52] U.S. Cl. .................................137/59, 138/32, 236/12, 251/234
[51] Int. Cl. ..........................................E03b 7/12
[58] Field of Search .................137/90, 59, 269; 236/12; 138/32; 251/234

[56] References Cited

UNITED STATES PATENTS

| 3,434,488 | 3/1969 | Talbot | 137/90 |
| 1,916,325 | 7/1933 | McAdams | 236/12 X |
| 1,983,821 | 12/1934 | Snediker | 236/91 X |
| 2,099,643 | 11/1937 | Werring | 236/99 X |
| 2,270,641 | 1/1942 | Ruppert et al. | 137/90 X |
| 2,430,133 | 11/1947 | Muffly | 137/90 X |
| 3,434,488 | 3/1969 | Talbot | 137/90 |

Primary Examiner—M. Cary Nelson
Assistant Examiner—Richard Gerard
Attorney—Clarence A. O'Brien and Harvey B. Jacobson

[57] ABSTRACT

The temperature of water within a container is regulated by a valve assembly admitting controlled amounts of water at a different temperature when a certain temperature limit within the container is exceeded. The valve assembly is submerged within the container and encloses a valve element exposed only to the inflow of water from the source.

10 Claims, 7 Drawing Figures

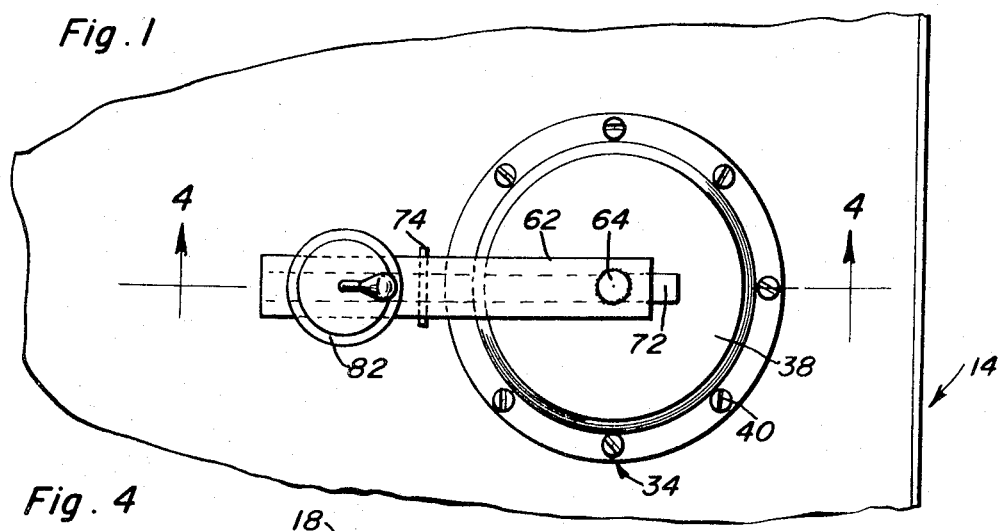
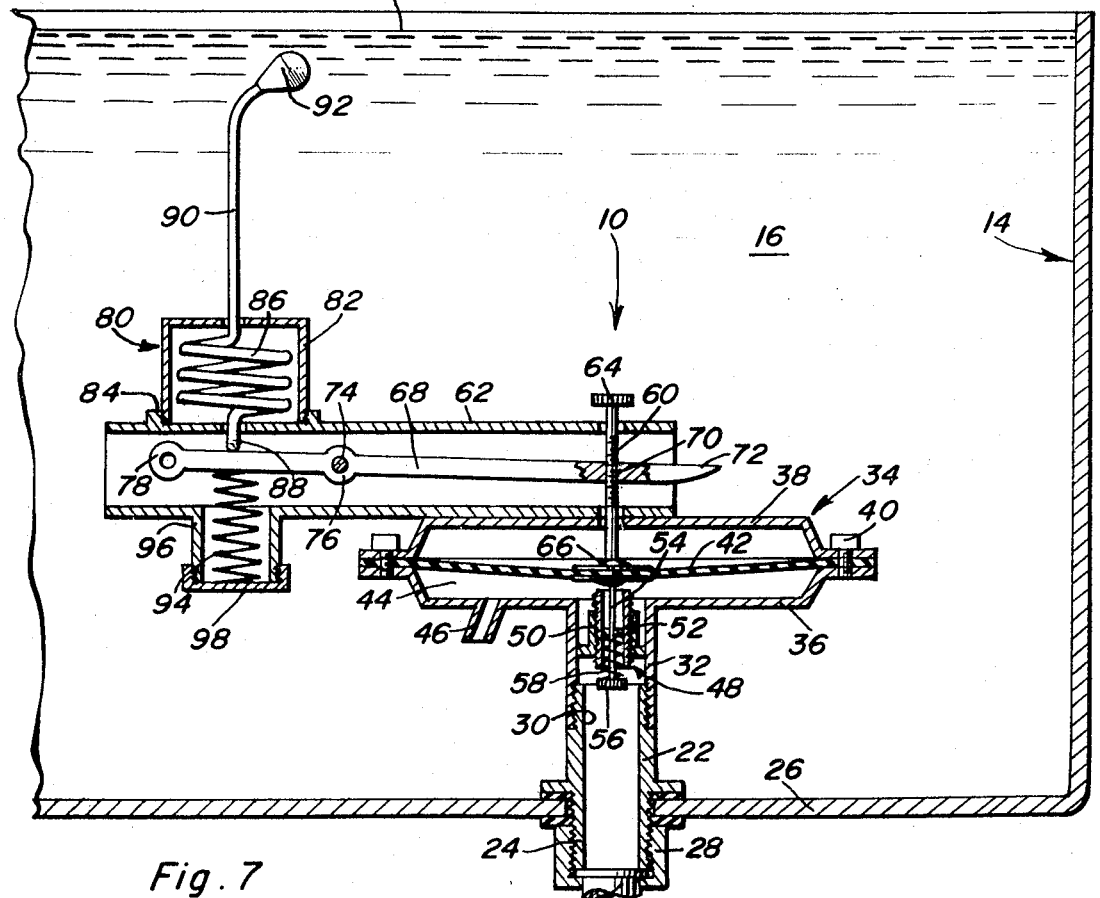
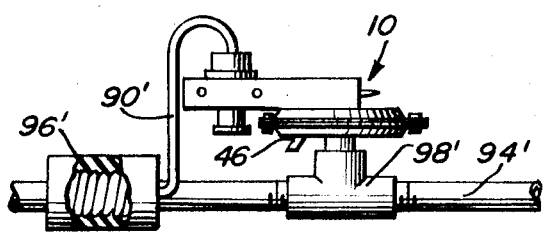

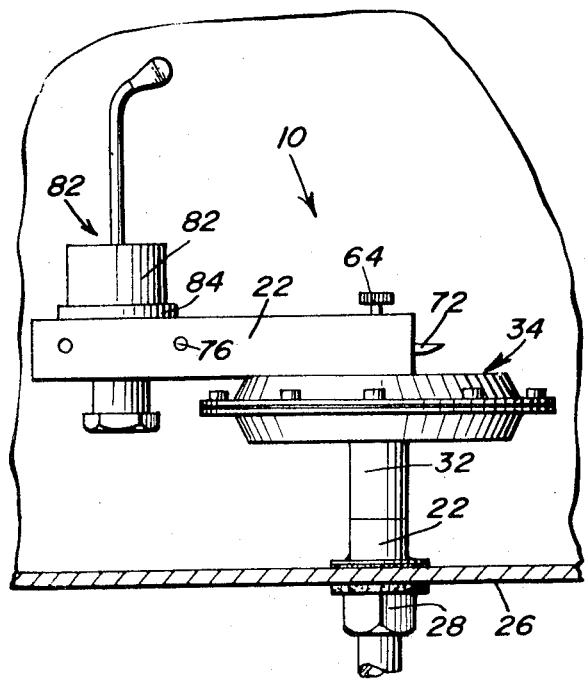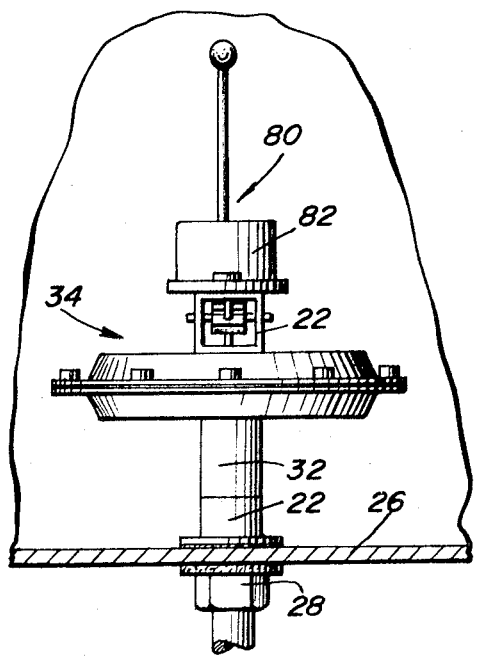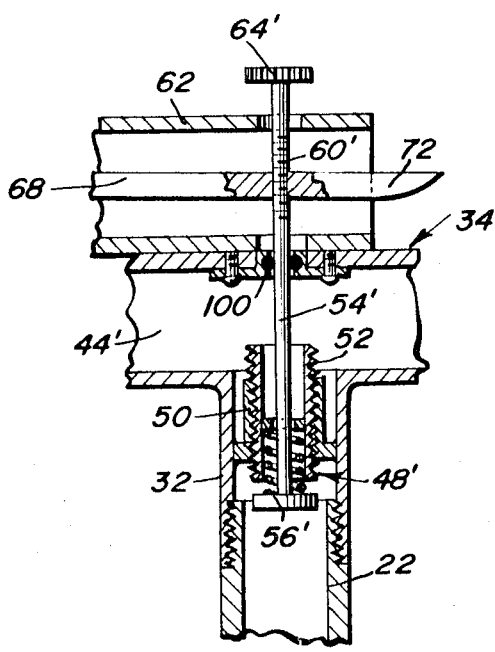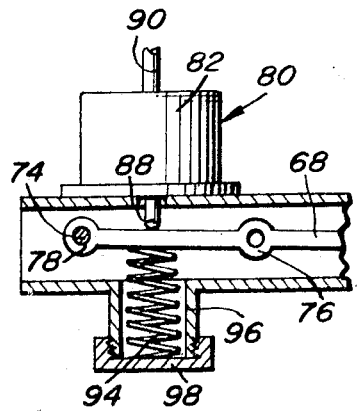

TEMPERATURE CONTROLLING LIQUID VALVE

This invention relates to apparatus for controlling the inflow of liquid from a source to a liquid container or reservoir in order to regulate the temperature of the liquid within the reservoir.

An important object of the present invention is to provide a relatively simple temperature-sensing valve assembly adapted to be completely submerged within a container of liquid yet reliably operative to regulate the temperature of this liquid by admitting controlled amounts of liquid at a different temperature from a source to which the valve assembly is connected.

In accordance with the present invention, a valve assembly is supported by an inlet fitting mounted on the wall of a container or reservoir, the inlet fitting establishing fluid communication between the source and an inlet chamber upon opening of a valve element against a closing bias. The valve element is opened through a pivoted trigger element when the temperature of the body of liquid within the reservoir exceeds a predetermined temperature limit. The trigger element is connected to the valve element through an adjustable rod so as to regulate the valve opening and closing conditions as the temperature of the liquid varies. The inlet chamber of the valve assembly is separated from the body of liquid being regulated so that the valve element is exposed only to the inflow of liquid from the source. The trigger element through which the valve element is pivotally displaced by means of a temperature-sensing arrangement, includes a portion projecting from its enclosing housing in order to facilitate testing of the valve assembly. The valve assembly may be conditioned for regulating the temperature of the liquid relative to either a high or a low temperature limit. Thus, the valve assembly will be useful to either prevent freezing of the liquid within the container or prevent the liquid from becoming excessively hot.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the valve assembly in a typical installation.

FIG. 2 is a side elevational view of the valve assembly shown in FIG. 1.

FIG. 3 is a front elevational view of the valve assembly.

FIG. 4 is an enlarged sectional view taken substantially through a plane indicated by section line 4—4 in FIG. 1.

FIG. 5 is a partial side sectional view of the valve assembly shown of FIG. 4 reconditioned for operating at another temperature limit.

FIG. 6 is a partial side sectional view showing a modified form of valve assembly constructed in accordance with the present invention.

FIG. 7 is a side elevational view with a portion in section showing another installation for the valve assembly of FIGS. 1-4.

Referring now to the drawings in detail, FIGS. 1, 2, 3 and 4 illustrate one form of the valve assembly generally denoted by reference numeral 10 mounted inside of a reservoir or container 14 completely submerged within a body of liquid 16 which is to be temperature regulated. The liquid may be water for example and the function of the valve assembly 10 as shown in FIGS. 1-4 is to prevent freezing of the water. Toward this end, whenever the water reaches a temperature of 28° F., at a location adjacent its top surface 18, water at a substantially higher temperature is admitted into the reservoir from an available source of water under pressure connected to the reservoir by the conduit 20. As soon as the temperature of the water 16 increases because of mixing with the incoming water from the source, the valve assembly 10 closes.

The valve assembly is supported inside of the reservoir by means of a tubular fitting 22 having an externally threaded portion 24 projecting through the bottom wall 26 of the reservoir. An internally threaded connector 28 couples the conduit 20 to the fitting 22 and sealingly clamps the fitting to the wall 26 of the reservoir. The externally threaded end portion 30 of the fitting inside of the reservoir is connected to the tubular, flow passage portion 32 of a valve housing 34 which is formed from a lower housing section 36 secured to the passage portion 32 and an upper housing section 38 peripherally secured to the lower housing section 36 by a plurality of fasteners 40. In the embodiment illustrated in FIG. 4, a flexible diaphragm member 42 is peripherally clamped between the housing sections 36 and 38 to form an inlet chamber 44. An outlet port formation 46 is formed in the lower housing section 36 in order to accommodate the outflow of liquid from the source into the body of liquid 16 for mixing therewith upon opening of a normally closed valve mechanism 48.

The valve mechanism includes a valve body 50 as shown in FIG. 4 internally secured within the passage portion 32 of the valve housing. The valve body is internally threaded for adjustably positioning a tubular valve seat 52 through which a valve stem 54 extends. A flow-responsive valve element 56 is secured to the lower end of the valve stem and is adapted to engage the lower axial end of the valve seat 52 under the bias of a spring 58 and the inflow of liquid in order to close the valve mechanism. The upper end of the valve stem 54 is connected to a central portion of the diaphragm member 42 within the inlet chamber 44.

The central portion of the diaphragm member outside of the inlet chamber 44, is connected to the lower end of an externally threaded, adjustable actuating rod 60 which projects upwardly through aligned openings in the upper housing section 38 and in a laterally elongated, tubular housing 62 secured to and supported on the upper housing section 38. The upper end of the actuating rod 60 projecting from the housing 62, is provided with a knurled knob 64 so that upon rotation of the actuating rod relative to the diaphragm member to which it is connected by a rotatable joint 66, the position of a trigger lever element 68 may be adjusted. The trigger element extends longitudinally through the housing 62 and is provided with an internally threaded opening 70 through which the actuating rod 60 threadedly extends. One end portion 72 of the trigger element projects from the axial end of the housing above the valve housing 34 in order to permit manual actuation of the valve mechanism 48. The trigger element is pivotally mounted by the housing in spaced relation to the actuating rod 60 by means of a pivot pin 74. Two sets of aligned openings are formed in the housing 62 through which the pivot pin 74 may be alternatively inserted in order to fulcrum the trigger element either at fulcrum location 76 or at fulcrum location 78. In the condition illustrated in FIG. 4, the pivot pin 74 extends through the fulcrum location 76 so that when the trigger element is angularly displaced about the pivot pin 74 in a clockwise direction, the trigger element will be operative through the actuating rod 60 to downwardly displace the valve element 56 and thereby open the valve mechanism 48 to admit water from the source into the inlet chamber 44 to be mixed with the water within the reservoir.

Valve opening movement is imparted to the trigger element 68 by means of a temperature-sensing device 80. The temperature-sensing device includes a casing 82 having an open threaded end portion threadedly mounted by an annular mounting portion 84 on the housing 22. The casing encloses a flexible coiled tube 86 having a lower, rigid end portion 88 engaging the trigger element 68 on the side of the fulcrum 76 opposite the actuating rod 60. The end portion 88 closes the flexible tube coil 86, the opposite end of which is connected through a connecting tube portion 90 to a bulbous sensing portion 92. The flexible tube portions enclose a gas such as Freon which volumetrically changes in response to temperature changes causing axial displacement of the tube coil portion 86. A spring 94 is disposed in alignment with the engaging end portion 88 of the temperature sensing device within a tubular formation 96 closed by a cap 98 in order to oppose the force exerted on the trigger element by the temperature-sensing device thereby holding the trigger element in constant engagement with the end portion 88 of the temperature-sensing device. Thus, at a predetermined temperature such as 28° F., the force with which the temperature-sensing device engages the trigger element will be overcome by the upward force of spring 94 in order to cause valve opening movement of the trigger element.

As hereinbefore indicated, valve opening movement of the trigger element 68 is in a clockwise direction as viewed in FIG. 4 and will be suitable for preventing freezing of the water 16 within the reservoir. The valve assembly 10 may however be conditioned for preventing the water within the reservoir from becoming excessively hot. Toward this end, the pivot pin 74 is moved to its alternate location extending through the fulcrum portion 78 of the trigger element 68 as shown in FIG. 5. In this condition, when the temperature of the water rises above a predetermined limit, the expansion of the Freon gas within the flexible tubular portions of the sensing device 80 will exert through the engaging end portion 88, a downward force overcoming the force of spring 94. In view of the mounting of the pivot pin 76 through the fulcrum portion 78 of the trigger element, downward displacement of the engaging end portion 88 of the sensing device will cause clockwise, valve opening movement of the trigger element. Thus, the valve assembly may be conditioned for regulating the temperature of the liquid relative to a high or low temperature limit by changing the location of the fulcrum pivot pin.

An important feature of the present invention is to separate the valve element from direct contact with the body of liquid being temperature regulated. Accordingly, the diaphragm member 42 hereinbefore described, serves this function. The diaphragm member may however be eliminated in favor of an annular wiping seal device 100 secured to the valve housing 34 within an opening through which a valve stem 54' extends as shown in FIG. 6. The valve stem 54' is associated with a valve mechanism 48' that is similar in construction, arrangement and function to the valve mechanism 48 hereinbefore described except that the valve stem 54' is integral with the externally threaded actuating rod 60'. Thus, the combined actuating rod and valve stem may be rotated by the knob 64' to adjust the points at which the valve mechanism 48' is opened and closed by the trigger element 68 under control of the temperature-sensing device as hereinbefore described in combination with FIGS. 1 through 5.

FIG. 7 shows another installation for the valve assembly 10 from which a flexible temperature sensing tube 90' extends. The tube is coiled about a waterline 94' within an insulating sheath 96'. The valve assembly itself is mounted by the T-connection 98' in the waterline. The valve assembly is adjusted as hereinbefore explained so as to open and conduct an outflow of water from line 94° when the temperature of the water, as sensed by the tube 90' in contact with the waterline, approaches a freezing value. Thus, flow of water from a warmer source is induced by opening of the valve assembly to thereby serve as a substitute for electric heating tape presently used to prevent waterline freezing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a reservoir of liquid and a pressurized source of said liquid at a predetermined temperature, means for regulating the temperature of the liquid within the reservoir comprising inlet valve means for admitting the liquid from the source into the reservoir and having an inlet chamber, a flow passage portion conducting liquid from the source to said inlet chamber and a flow-responsive valve element normally blocking flow of liquid through the flow passage portion, a housing supported on the valve means and extending laterally therefrom, a trigger element having an end portion projecting from the housing above the valve means, fulcrum means pivotally mounting the trigger element within the housing, temperature-sensing means mounted on the housing and engageable with the trigger element for pivotal displacement thereof in response to the temperature of the liquid within the reservoir, spring means mounted by the housing for maintaining the temperature-sensing means in engagement with the trigger element, and actuating means connected with the valve element and with the trigger element adjacent said end portion for transmitting opening movement to the valve element when said temperature limit is exceeded.

2. The combination of claim 1 wherein said fulcrum means includes a pivot pin and alternate openings in the trigger element through which the pin is selectively received on either side of the sensing means relative to the actuating means.

3. The combination of claim 1 wherein the actuating means includes a threaded rod connected with the valve element and threadly connected to the trigger element.

4. The combination of claim 3 including a wiping seal through which the rod extends into the inlet chamber.

5. The combination of claim 3 including a tubular fitting connecting the source to the passage portion of the valve means supporting the same submerged within the liquid inside the reservoir.

6. The combination of claim 1 including a diaphragm member interconnecting the actuating means with the valve element and sealing one from the other.

7. The combination of claim 1 including a tubular fitting connecting the source to the passage portion of the valve means and supporting the same submerged within the liquid inside the reservoir.

8. The combination of claim 1 wherein said inlet valve means includes biasing means for opposing movement of said valve member from the open position to the normally closed position.

9. A device for controlling the temperature of a body of liquid comprising valve assembly means for selectively preventing freezing and overheating of the body of liquid by the addition of a liquid of a different temperature to the body of liquid, and means responsive to the temperature of the body of liquid for actuating the valve assembly means, said valve assembly means including inlet valve means for adding the different temperature liquid, a trigger element interconnecting the inlet valve means with said temperature-responsive means, and fulcrum means pivotally mounting said trigger element and including a pivot pin and alternate openings in said trigger element through which the pin is selectively received on either side of the temperature-responsive means relative to the inlet valve means.

10. The device set forth in claim 9 wherein said temperature-responsive means and said inlet valve means are spaced from each other along an intermediate section of said trigger member, one of said alternate openings being located at a point intermediate said temperature-responsive means and said inlet valve means and another of said alternate openings being located at a point beyond said intermediate section of said trigger member.

* * * * *